May 18, 1965  R. R. CARLTON  3,183,948
SAW CHAIN
Original Filed Oct. 12, 1959  4 Sheets-Sheet 1
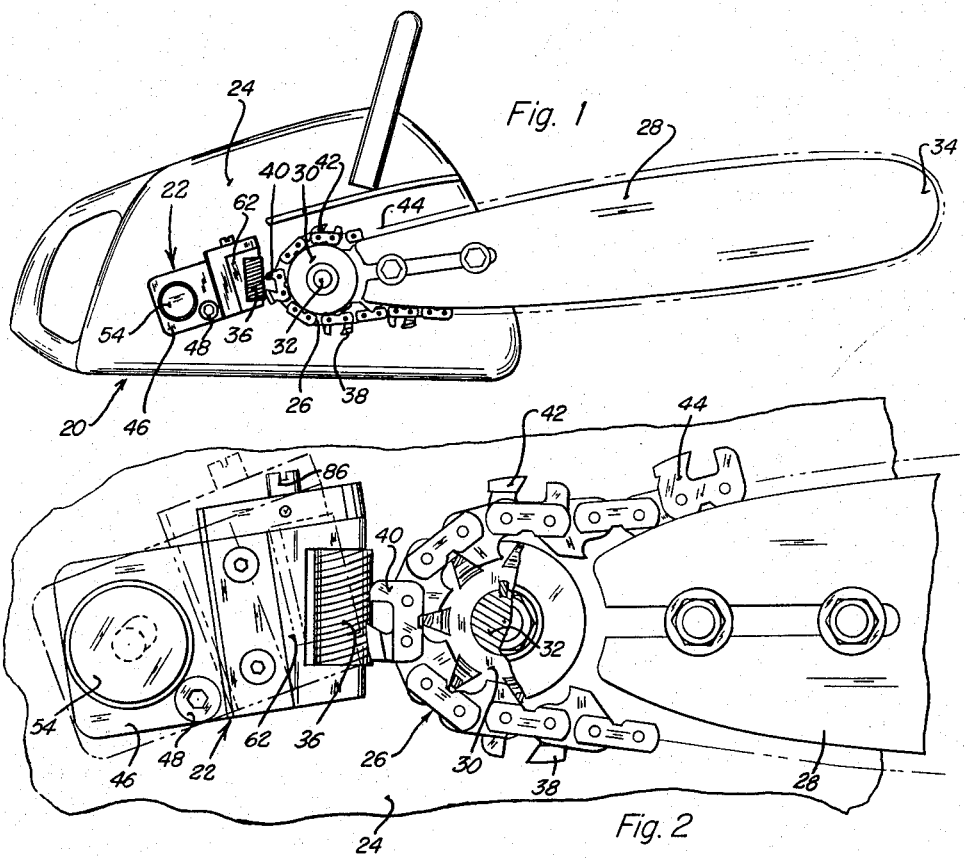
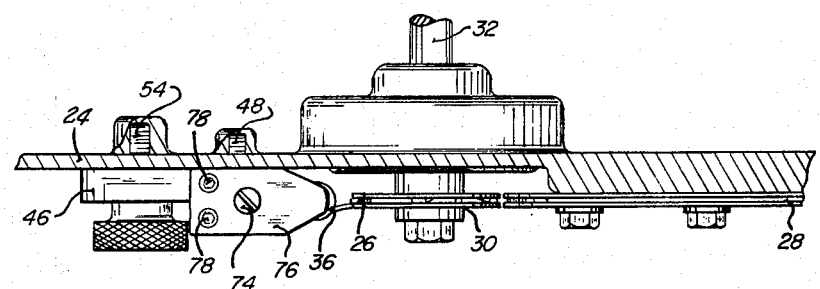
INVENTOR.
RAYMOND R. CARLTON
BY
BUCKHORN, CHEATHAM & BLORE
ATTORNEYS

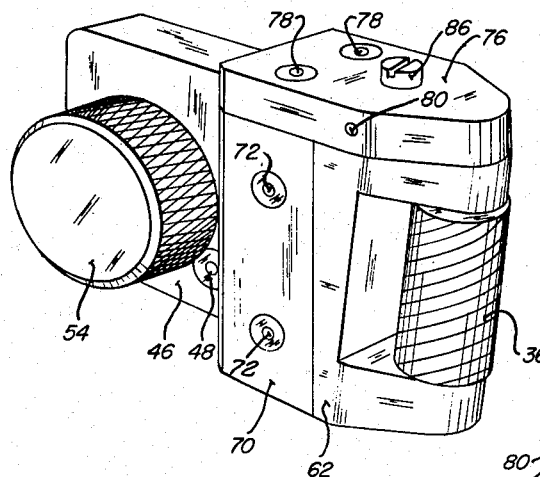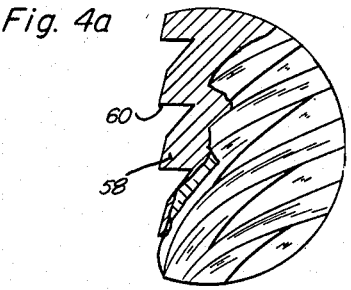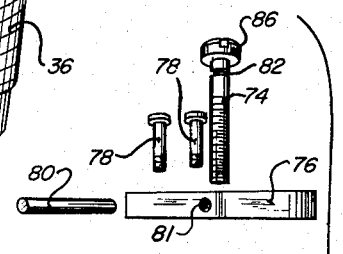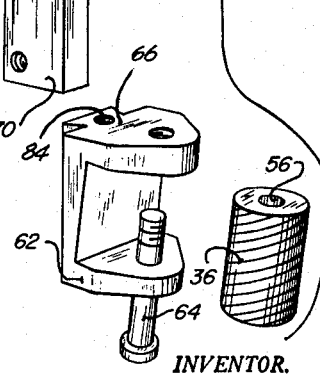

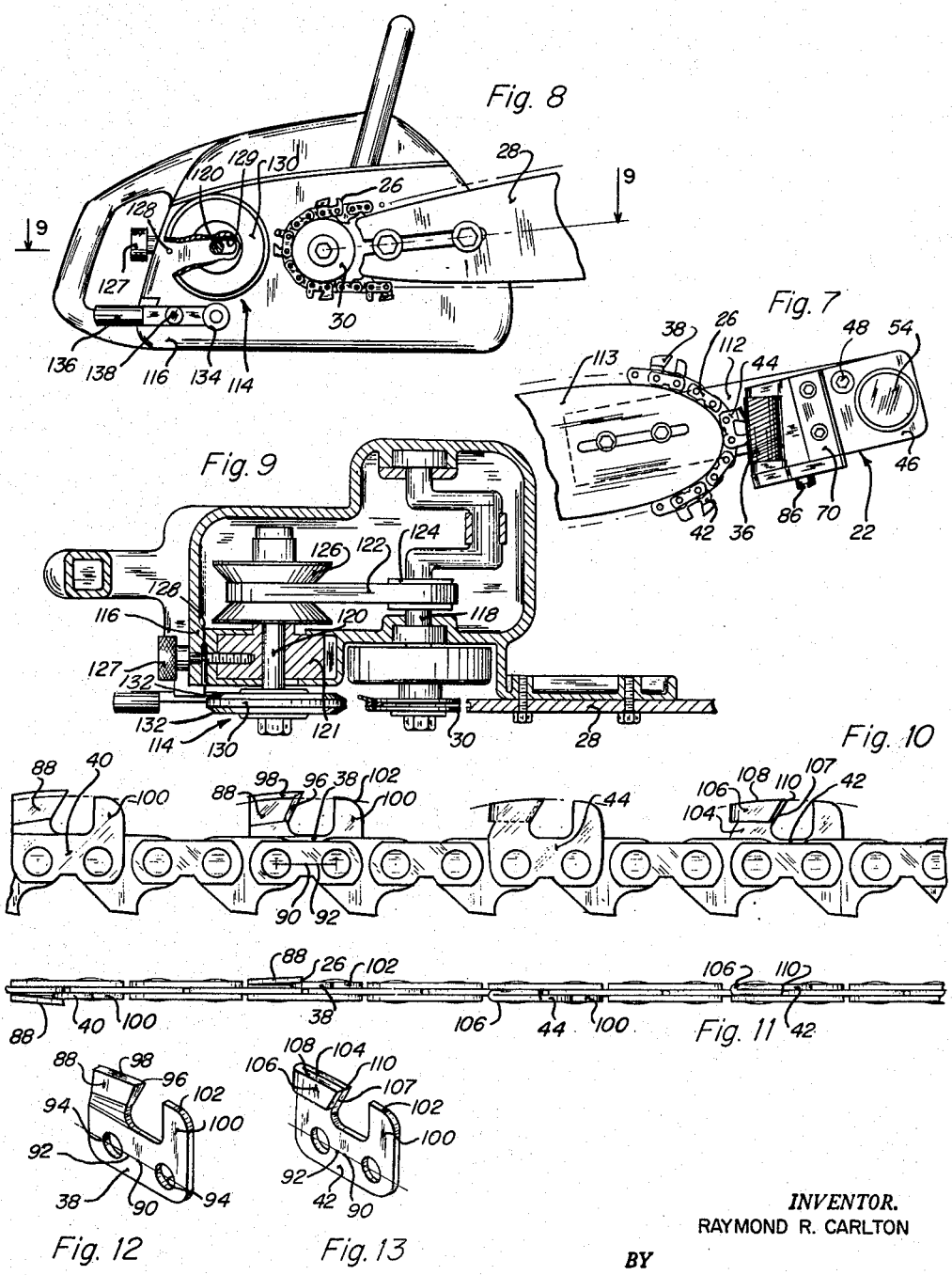

United States Patent Office 3,183,948
Patented May 18, 1965

3,183,948
SAW CHAIN
Raymond R. Carlton, Portland, Oreg., assignor to Omark Industries, Inc., Portland, Oreg., a corporation of Oregon
Original application Oct. 12, 1959, Ser. No. 845,788, now Patent No. 3,040,602, dated June 26, 1962. Divided and this application May 2, 1962, Ser. No. 191,822
3 Claims. (Cl. 143—135)

This invention relates to a saw chain sharpener and more particularly to a saw chain capable of being sharpened by the method and with the general type of sharpener herein disclosed, while the chain is mounted upon a chain saw bar and being driven by a chain saw sprocket. This application is a division of my copending application, Serial No. 845,788 filed October 12, 1959, now Patent 3,040,602, issued June 26, 1962.

Mechanisms for use in sharpening a saw chain while in position upon a chain saw and being driven by the chain saw sprocket have been suggest in the prior art. Such mechanisms have taken the form of saw sharpening devices temporarily mounted upon the nose end of the saw bar, which is the end remote from the sprocket. Such devices have included sharpening elements brought into contact with the cutter elements of the cutter links of scratcher type chain as such cutter links are moved around the nose of the cutter bar. The surfaces of the cutter elements thus contacting the sharpening element are those most remote from the saw bar which surfaces will be herein referred to as the outer surfaces of the cutter links.

By positioning the cutter elements of the cutter links rearwardly of the midpoint of lines joining the centers of the rivets or other pivots of the respective cutter links, it has been possible to sharpen scratcher type cutter elements and produce a type of relief on the cutting elements which is effective for cutting with the portion of the chain traveling along a side edge of the saw bar. This type of cutting is frequently called "slicing." The outer surfaces thus produced are, however, concentric with the curved nose portion of the saw bar. They have no relief at all so far as the operation with a chain saw known as "stabbing" or "boring" is concerned. Such operation has become an established and important method of using a chain saw and consists of pushing the nose end of the chain saw endwise into a tree, log or other object being cut so that the cutting is actually accomplished by the cutter elements which are being carried around the nose end of the bar. Unless such cutting elements are provided with properly relieved outer surfaces, the boring operation is inefficient and difficult. Thus excessive force is required to force the nose end of the chain saw into the wood being cut.

Mounting the sharpening mechanism upon the nose end of the cutter bar has also required that the chain saw be taken out of service while the sharpening mechanism is being attached and detached as well as during the time a sharpening operation is being actually carried out. This has restricted the utility of prior art sharpening devices intended for use while the saw chain is mounted upon a chain saw and is being driven by the chain saw sprocket.

The difficulties above discussed are eliminated by mounting a sharpening device directly upon the body of the chain saw adjacent the chain saw sprocket so as to remove metal from the outer surfaces of the cutter links. Such sharpening device can be left in place upon the saw at all times and, if desired, can actually be employed to sharpen the saw chain upon the chain saw while the saw is being employed in a cutting operation. In any event, the sharpening device need not be removed during operation of the saw but may be allowed to remain attached to the saw at all times so that it is not necessary to take the saw out of service while attaching and removing a sharpening mechanism. Also by employing a chain saw sprocket of substantially smaller radius than the radius of curvature of the nose end of the saw bar, proper relief of the outer surfaces of the cutter elements of the saw chain can be produced so that efficient boring with the sharpened saw chain as well as slicing can be accomplished.

The sharpening element of the saw chain sharpener can be shaped so as to effectively sharpen nearly any type of scratcher saw chain which has the cutting elements thereof rearwardly of the midpoints of the respective cutter links as discussed above. The sharpening device is, however, particularly effective for sharpening a new type of chain disclosed herein in which each cutter link whether it be of a type having a side slitter cutter element or of a type having a raker cutter element thereon or any other type, is also provided with a depth gauge which has an outer kerf bottom contacting surface spaced forwardly of such midpoint of the respective cutter link a greater distance than the cutting portion of the cutter element of such link is spaced rearwardly from such midpoint. The outer surfaces of such depth gauges are thus given proper relief not only for slicing operations of the chain saw but also for boring operations. The relief of the outer surfaces of such depth gauges as well as the relief of the outer surfaces of the cutter elements of a properly constructed chain is of such uniformity throughout the length of the chain as to provide a smooth operation and rapidity of cutting of a greater order than possible with prior saw chains.

An object of the invention is to provide a new and improved type of saw chain particularly adapted for being sharpened by the method and with the sharpening devices shown and described in the present application.

Other objects and advantages of the invention will appear in the following description of the invention including the structures shown in the attached drawing of which:

FIG. 1 is a somewhat diagrammatic side elevation of a chain saw showing a sharpening device adapted to sharpen the saw chain of the present invention mounted thereon;

FIG. 2 is a fragmentary side elevation showing a portion of the structure of FIG. 1, including the saw chain sharpening device thereof on a greatly enlarged scale and with parts of the chain saw sprocket broken away;

FIG. 3 is a fragmentary horizontal section through the structure of FIG. 2 showing the saw chain sharpening device in top plan;

FIG. 4 is an isometric view of the saw chain sharpening device on a still larger scale;

FIG. 4a is a fragmentary view on an enlarged scale and partly in vertical section of a portion of the sharpening element of the device shown in FIGURE 4;

FIG. 5 is a side elevation of the saw chain sharpening device with certain parts in a different position than in FIGS. 2 and 4;

FIG. 6 is an isometric exploded view of the saw chain sharpening device of FIGS. 1 to 5;

FIG. 7 is a fragmentary side elevation showing a modified manner of mounting the saw chain sharpening device of FIGS. 1 to 6 upon a chain saw;

FIG. 8 is a view similar to FIG. 1 showing a modified saw chain sharpening device;

FIG. 9 is a somewhat diagrammatic horizontal section through the chain saw of FIG. 8 on line 9—9 of FIG. 8;

FIG. 10 is a side elevation of a saw chain of the present invention which saw chain is particularly adapted for sharpening by the method and by the sharpening devices disclosed in the present application;

FIG. 11 is a top plan view of the saw chain of FIG. 10;

FIG. 12 is a perspective view of a side slitter cutter link of the saw chain of FIGS. 10 and 11;

FIG. 13 is a view similar to FIG. 11 of a raker cutter link of the saw chain of FIGS. 10 and 11.

Figure 14:
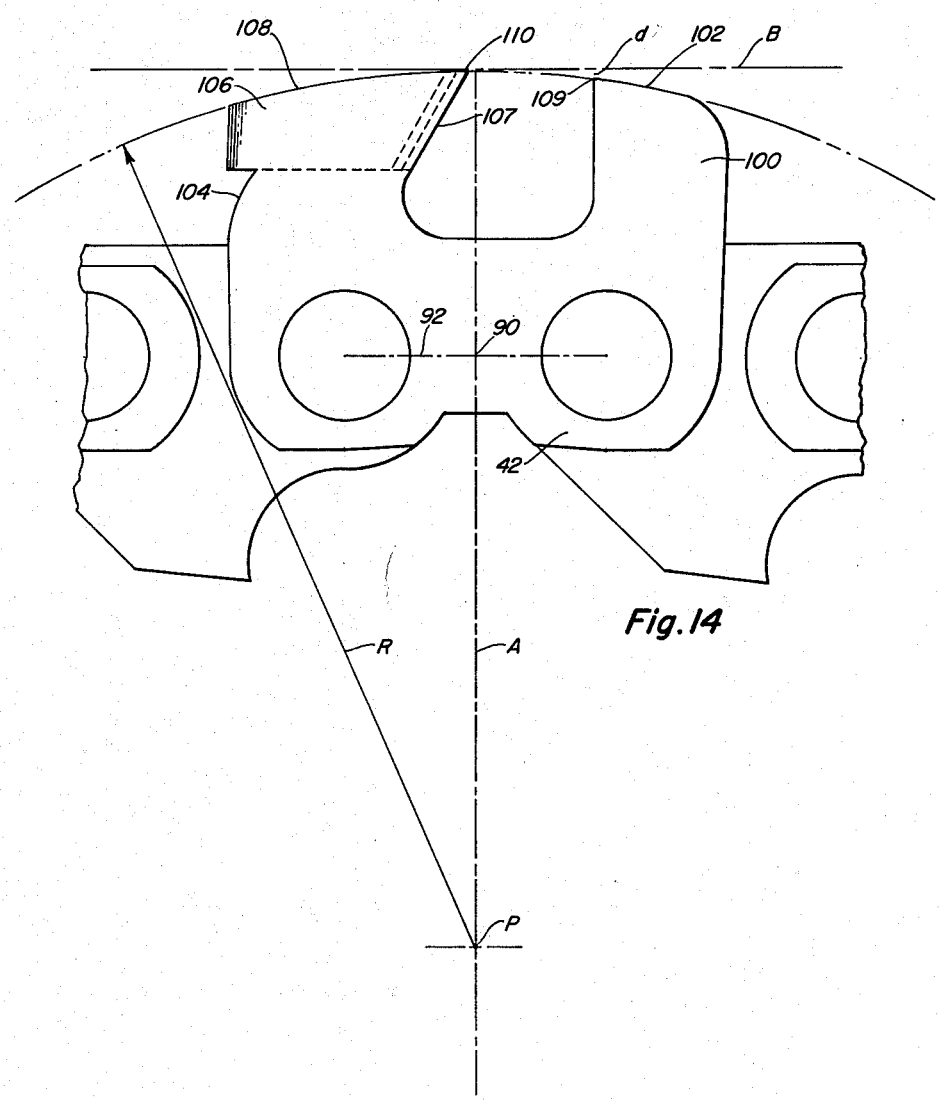
FIG. 14 is an enlarged side view of the raker cutter link shown in FIGS. 10 and 13.

Referring more particularly to the drawing, a chain saw 20 is shown in FIG. 1 as having a saw chain sharpening device 22 mounted upon the motor housing or body 24 of the saw in position to sharpen a saw chain 26 mounted upon a saw bar 28 secured to and extending from the body 24 of the saw. The chain 26 is also mounted upon and driven by a chain saw sprocket 30 which in turn is mounted upon a sprocket drive shaft 32 driven by the saw chain motor (not shown). The sprocket 30 has a smaller pitch radious than the pitch radius of the nose end 34 of the saw bar 28 and the sharpening device 22 has a sharpening element 36 positioned for contact with the outer surfaces of the various cutter links 38, 40, 42 and 44 as they are carried around the periphery of the sprocket 30.

The details of the sharpening device 22 are shown in FIGS. 2 to 6 and include a base block 46 pivotally secured adjacent its lower right corner in FIGS. 1 and 2 to the body 24 of the chain saw by means of a screw 48 having an enlarged head received in a socket 50 (FIG. 6) in the base block 46 and having a shank screw threaded into the body of the chain saw. The base block 46 also has an arcuate slot 52 concentric with the axis of the screw 48 extending through the body of the base block adjacent its end opposite the screw 48. Such slot 52 receives the shank of a clamping screw 54 having an enlarged knurled head, the end of the shank of the screw also being screw threaded into the body 24 of the chain saw. It will be apparent that the base block 46 of the sharpening device 22 can be pivoted about the screw 48 between the operative position of the sharpening device shown in full lines in FIG. 2, and the inoperative position of such device shown in dash-dot lines in such figure and that the base block 46 can be clamped in either position by the clamping screw 54.

The sharpening element 36 is of cylindrical shape having an axial bore 56 (FIG. 6) therein and an outer cylindrical surface provided with a plurality of helically extending metal cutting teeth 58 (FIG. 4) preferably of the form shown in such figure with properly relieved downwardly directed cutting edges 60. Such sharpening element is preferably made of a hard alloy capable of remaining sharp while employed to remove metal from the cutter links of a saw chain. The sharpening element is supported between the yoke portions of a yoke shaped slide member 62 and is journaled for rotating in such slide member 62 about the axis of a screw 64 (FIG. 6) extending through the yoke portions of the slide member and having one end screw threaded into one of such yoke members. The slide member 62 is mounted for vertical sliding motion along the edge of the base block 46 by means of a dovetail element 66 on the slide member 62 and a dovetail slot structure on the base block 46 including an integral undercut portion 68 and a cooperating removable guiding element 70 having an undercut portion and held in position on the base block 46 by screws 72 having shanks threaded into the base block.

The slide member can be adjusted vertically of the base block 46 by an adjusting screw 74 having a shank extending through a bore in a top plate 76 secured to the base block 46 and removable guiding element 70 by the screws 78. The screw 74 is held against axial movement relative to the plate 76 by a pin 80 extending laterally through a bore 81 in the plate 76 and engaging in a groove 82 in the shank of the screw 74. The shank of the screw is threaded into a vertically extending bore in the slide member 62. By rotating the screw 74 by its knurled and slotted head 86, the slide member can be moved from the upper position shown in FIG. 4 toward the lower position shown in FIG. 5.

The axis of the sharpening element 36 is inclined to the direction of sliding motion of the slide member 62 provided by the dovetail portion 66 of the slide member so that the top end of the sharpening element is spaced farther from such dovetail portion than the lower end of such sharpening element. The axis of the sharpening element is also in the central plane of the saw chain 26 and sprocket 30 therefor and it will be apparent from FIG. 2 that downward adjustment of the slide member 62 by the screw 86, when the sharpening device is in the operative position shown in full lines in FIG. 2, will advance the sharpening element toward the saw chain 26 on the sprocket 30.

The operation of the saw sharpening device of FIGS. 1 to 6 should be apparent from the above description thereof. With the sharpening device clamped in the position shown in FIG. 1 and in full lines in FIG. 2 by the screw 54, the saw is started and the saw chain 26 on the sprocket 30 and saw bar is driven by the sprocket so as to move the saw chain cutter links 38, 40, 42 and 44 in a clockwise direction around the periphery of the sprocket. The screw 86 is adjusted to cause the sharpening element 30 to engage the outer surfaces of the cutter links of a scratcher type chain to remove metal therefrom. Since the sharpening element is convex toward the saw chain, the cutter portions of the raker cutter links are cut or ground lower than the cutter portions of side slitter cutting links. This is true because such portions of raker cutter links are nearer the central plane of the chain than those of side slitter cutter links. Also since the cutter teeth on the sharpening element are of helical form, the sharpening element revolves on the screw 64 to constantly present new cutting edges and distribute the wear circumferentially around such element. After a sharpening operation, the sharpening device 22 can be moved to the inoperative position shown in dotted lines in FIG. 2 until another sharpening operation is needed.

An improved type of chain particularly adapted for being sharpened by the method and sharpening devices described above is shown in FIGS. 10 to 13 inclusive. Such chain is shown in FIGS. 10 and 11 as having a left slitter cutter link 38 followed by a right side slitter cutter link 40 and a left raker cutter link 42 followed by a right raker cutter link 44. The order of such links is different from that shown in FIG. 2 but the order of such links may be varied. In general a pair of side slitter cutter links made up of right and left side slitter cutter links will be followed by a pair of raker cutter links made up of right and left raker cutter links and the latter pair will again be followed by a pair of side slitter cutter links, etc. Also, in general, alternate cutter links will be right and left cutter links.

A left side slitter link is shown in FIG. 12 as having an outwardly projecting cutter element 88 which is positioned rearwardly of the midpoint 90 of a line 92 joining the centers of the rivet holes 94 of the cutter link 38 so that the point 90 is the midpoint of a line joining the centers of the pivots of such link. The cutter element 88 is inclined laterally of the chain in both a direction outwardly of the chain and forwardly thereof, as shown most clearly in FIG. 11, and has a leading edge portion 96 beveled to provide a sharpened forwardly directed edge at the lateral extremity of the cutter element, which edge is inclined forwardly and laterally of the cutter element. The engagement of the sharpening element 36 of FIGS. 1 to 6 with the cutting element 88 while the cutter link 38 is being carried around the sprocket 30 will produce an arcuate beveled surface 98 and a cutting edge which has proper relief rearwardly of the leading edge 96.

The cutter link 38 also has an outwardly projecting depth gauge 100 thereon having its trailing edge positioned forwardly of the midpoint 90 of the line 92 a greater distance than the leading edge 96 of the cutter element 88 is positioned rearwardly of such midpoint. This means that the outer kerf bottom engaging surface 102 of depth gauge 100 is positioned a greater distance forwardly of the midpoint 90 than the cutting portion of the cutting element 88 is positioned rearwardly of such midpoint. This further means that the surface 102 is nearer the line 92 than the cutting portion of the cutter element. Such cutting portion is the leading outer corner of such cutting element. This provides the depth gauge 100 with proper relief for cutting operations including both slicing and boring operations. The cutter link 40 is allochiral to the cutter link 38 and will not be further described.

The left raker cutter link 42 is shown most clearly in FIG. 13 and includes an outwardly projecting raker cutter element 104 which is laterally thickened by having an extending portion 106 bent back upon itself and spot welded to the body of the raker element. The raker element is inclined slightly laterally in both an outward and forward direction and has a leading edge portion 107 positioned rearwardly of the midpoint 90 of the link 42. The edge portion 107 is inclined forwardly as well as laterally. The raker cutter element 104 has metal removed from its outer surface 108 by the sharpening element of FIGS. 1 to 6 during sharpening of the chain to provide a sharpened cutting edge 110. The depth gauge 100 of the link 42 may be identical with the depth gauge 100 of the link 38 and may occupy the same relative position with respect to its associated cutting element so that its outer surface 102 is nearer the line 92 than the cutting edge 110 to provide proper relief for such depth gauge. The right raker cutter link 44 is allochiral to the link 42 and will not be further described.

It is apparent that the outer end surfaces 98 and 108 of the cutter elements 88 and 104, respectively, and the outer end surfaces 102 of the depth gauges 100 will be arcuate convex surfaces and that these arcuate surfaces of both the cutter and depth gauge elements have the same radius of curvature and are concentric about a common axis parallel to the pivot axes of the link.

The relationship is clearly shown for raker link 42 in FIG. 14. There the outer end surface 108 of the cutter element 104 and the outer end surface 102 of the depth gauge 100 are shown to be arcuate convex surfaces having the same radius R, and are concentric about an axis through point P. This axis lies in a plane A passing through the midpoint 90 of the line 92 joining the pivot axes. Plane A is perpendicular to line 92. As can be seen, the trailing edge 109 of the depth gauge 100 is positioned forwardly of midpoint 90 a greater distance than the cutting edge 110 is positioned rearwardly of midpoint 90. Thus, the edge 109 is closer to line 92 than is the edge 110 by the distance $d$ measured from plane B, where $d$ is the amount of clearance necessary for proper cutting operations. It is thus apparent that due to the particular configuration of the links of the present invention, this clearance $d$ is correctly maintained even as the chain is sharpened while in position upon the chain saw. Since the radius of curvature of the nose of the saw bar is greater than radius R, the distance $d$ will insure proper clearance for boring as well as slicing operations.

It should be noted, however, that the outermost edge of the cutter element 88 on the slitter cutter links 38 and 40 is curved to a radius greater than the depth gauges 100 due to the bevel on the upper surface 98 thereof, it being noted that the radius of curvature of the depth gauge 100 is more nearly equal to that of the innermost edge of surface 98. This is clearly shown in FIG. 10. Thus, whereas in the case of the raker link 42 shown in FIG. 14 the outer surfaces 108 and 102 of the cutter element 104 and depth gauge 100, respectively, have the same radius of curvature R, in the case of the slitter links 38 and 40, the radii of curvature of the outer surfaces 98 and 102 are only substantially the same, due to the bevel on the surface 98 as above described.

Scratcher chains have been known to be smooth running, rapid cutting chains when properly sharpened and the main reason they have not been more generally employed is that proper sharpening has been difficult and time consuming even for an expert when compared to other more generally employed chains. With the present chain having depth gauges on all cutter links and precise sharpening such as provided by the method and devices of the present invention, a new order of rapid cutting and smooth operation is accomplished with a chain which can be sharpened in a matter of seconds without removing the chain saw from service.

With chain saws which cannot be modified to install the sharpening device of FIGS. 1 to 6 upon the body of the chain saw, it is possible to temporarily install the sharpening device 22 upon a support plate 112 shown in FIG. 7 and then secure such plate to the nose end of a suitably modified chain saw bar 113. The sharpening device 22 can be employed to sharpen cutter links 38, 42 and 44 as they are carried around the nose end of the bar. This merely illustrates the versatility of the sharpening device 22 but does not accomplish all of the results of the method discussed above. The employment of the sharpening device as illustrated in FIG. 7 will sharpen a chain of the type illustrated or any of the types discussed above adequately for slicing operations of the chain saw but not for efficient boring operations, since proper relief is not provided for boring.

In any of the uses of the sharpening devices 22, the sharpening element may, for example, be of tungsten carbide, tantalum carbide or titanium carbide, or any of the other hard carbides or other hard materials employed as cutting elements for removing metal such as steel from metal surfaces. A tungsten carbide metal removing sharpening element formed with a plurality of helical cutting teeth, such as shown in FIG. 4, has been found particularly effective but other metal removing elements, such as suitable soft metals with diamonds or other hard materials embedded therein, can be employed.

A modified sharpening device 114 for carrying out the method of the present invention is shown in FIGS. 8 and 9. In such figures a saw bar 28 and sprocket 30 support and drive a saw chain 26 and all of such elements may be the same as the corresponding elements described with reference to FIGS. 1 to 6 and 10 to 13. The chain saw has a modified body portion 116 in the form of a casing in which the main drive shaft 118 of the saw is journaled, such shaft having the sprocket 30 mounted upon one of its ends which is external to the casing 116.

The sharpening device 114 includes another shaft 120 journaled in a bearing block 121 slidable in the casing 116 toward and away from the shaft 118. The shaft 120 is driven from the shaft 118 by a belt 122 on pulleys 124 and 126 on the shafts 118 and 120, respectively, the pulley 126 being any suitable or known type of spring expansible pulley so that the shaft 120 can be moved toward and away from the shaft 26 while being driven by the belt 122. Movement of the shaft toward and away from the shaft 118 can be accomplished by sliding the bearing block 121 in the casing 116 by means of a screw 127 passing through the end wall of the casing 116 and having its shank screw threaded into the bearing block 121. The screw is rotatable in the casing 116 but is held against axial movement therein by a pin 128 engaging in a groove in the shank of the screw 127. It is apparent that turning of the adjusting screw will advance the shaft 120 toward the shaft 118 or retract it depending upon the direction the screw is turned.

The shaft 120 has an end projecting through a slot 129 in a side wall of the casing 116 and has a metal removing member in the form of a grinding wheel 130 mounted on such end exteriorly of such casing. The central plane of the grinding wheel 130 is in the central plane of the sprocket 30 and chain 26 and has its outer periphery shaped to provide beveled edges 132 for properly grinding the cutter elements of chains of the types above described. Such shape of the outer periphery of the grinding wheel may be maintained by a grinding wheel dresser 134 which may be of any suitable type, such as a conventional pressure dresser. The dresser 134 is rotatively mounted upon the end of a lever 136 pivoted to the casing 116 at 138 so that the dresser 134 can be manually held against the periphery of the grinding wheel 130.

It will be apparent that the shaped outer periphery of the grinding wheel 130 may be brought into engagement with the outer surfaces of the cutter elements of the cutter links of the saw chain 26 while such cutter links are being carried around the sprocket 30 and while the wheel 130 is being rapidly rotated to remove metal from such outer surfaces. The result is to sharpen the saw chain and provide properly relieved outer surfaces on the cutter elements and any depth gauges on the chain of the same type described above with reference to the sharpening device of FIGS. 1 to 6. Again the saw chain can be sharpened while in position upon the saw and without taking the saw out of service to provide a properly sharpened smooth running, fast cutting saw chain.

I claim:
1. A saw chain cutter link for use in a saw chain which can be sharpened while mounted upon a chain saw and while being positioned on and driven by the chain saw sprocket, comprising:
  a link body having forward and rear ends and having means defining parallel pivot axes spaced from each other longitudinally of said link,
  a cutter element projecting outwardly from the rear of said body and having on its outer portion a forwardly projecting cutting edge positioned rearwardly of the midpoint of the line joining said pivot axes,
  a depth gauge element projecting outwardly from the front of said body in the same direction as said cutter element and a lesser distance from said line joining said pivot axes than said cutter element,
  said depth gauge element being spaced from said cutter element forwardly of said body and having its outer trailing edge positioned forwardly of said midpoint a greater distance than said cutting edge is positioned rearwardly of said midpoint,
  each of said cutter and depth gauge elements terminating at its outer end in a convex arcuate surface,
  the arcuate surfaces of both said elements having substantially the same radius of curvature and being concentric about a common axis parallel to said pivot axes and in a plane through said midpoint, said plane being perpendicular to said line joining said pivot axes.

2. A saw chain cutter link as described in claim 1, in which said cutter element is inclined laterally and has a leading outwardly extending edge inclined forwardly and laterally of said cutter element.

3. A saw chain cutter link as described in claim 2, in which the outermost edge of said arcuate surface of said cutter element has a greater radius of curvature than does said arcuate surface of said depth gauge element.

References Cited by the Examiner
UNITED STATES PATENTS 2,832,180    4/58    Carlton _____ 143—135 X
2,832,380    4/58    Crowe.
3,040,602    6/62    Carlton.

OTHER REFERENCES

Stihl: German application 1,098,186, printed Jan. 26, 1961 (KL. 38a 11), (1 sht. dwg., 2 pp. spec.).

WILLIAM W. DYER, JR., *Primary Examiner.*
DONALD R. SCHRAN, *Examiner.*